United States Patent [19]

Wild

[11] Patent Number: 5,560,243
[45] Date of Patent: Oct. 1, 1996

[54] DEVICE FOR VENTING A FUEL TANK AND A PROCESS FOR CHECKING THE FUNCTIONAL CAPABILITY OF THE DEVICE

[75] Inventor: Ernst Wild, Oberriexingen, Germany

[73] Assignee: Robert Bosch GmbH, Stuttgart, Germany

[21] Appl. No.: 339,679

[22] Filed: Nov. 14, 1994

[30] Foreign Application Priority Data

Dec. 8, 1993 [DE] Germany ............. 43 41 777.9

[51] Int. Cl.⁶ ................................. F02M 37/04
[52] U.S. Cl. ............. 73/118.1; 73/40.5 R; 73/49.7
[58] Field of Search ............... 73/117.3, 118.1, 73/49.7, 49.2, 40, 40.5 R

[56] References Cited

U.S. PATENT DOCUMENTS

| | | | |
|---|---|---|---|
| 5,072,623 | 12/1991 | Hendershot | 73/49.2 |
| 5,117,677 | 6/1992 | Hendershot et al. | 73/49.2 |
| 5,146,902 | 9/1992 | Cook et al. | 73/118.1 |
| 5,150,689 | 9/1992 | Yano et al. | 73/118.1 |
| 5,251,477 | 10/1993 | Nakashima et al. | 73/118.1 |
| 5,267,470 | 12/1993 | Cook | 73/49.7 |
| 5,275,144 | 1/1994 | Gross | 73/118.1 |
| 5,317,909 | 6/1994 | Yamada et al. | 73/118.1 |
| 5,327,776 | 7/1994 | Yasui et al. | 73/118.1 |
| 5,343,738 | 9/1994 | Skaggs | 73/40.5 R |
| 5,408,866 | 4/1995 | Kawamura et al. | 73/49.7 |
| 5,425,266 | 6/1995 | Fournier | 73/49.7 |
| 5,467,641 | 11/1995 | Williams et al. | 73/40.5 R |

FOREIGN PATENT DOCUMENTS 4003751 8/1991 Germany .

Primary Examiner—Richard Chilcot
Assistant Examiner—George M. Dombroske
Attorney, Agent, or Firm—Edwin E. Greigg; Ronald E. Greigg

[57] ABSTRACT

A venting device comprising connecting lines which are embodied as double-walled that form hollow spaces and whose hollow spaces communicate with one another and with an intake pipe by means of bypass lines. By means of a pressure sensor installed in a bypass line, the vacuum is measured; normally this vacuum must roughly correspond to the vacuum in the intake pipe and if this is the case, it can be concluded that the venting device is functional and tight. If there is a large increase in the vacuum measurement then it is concluded that there is a leak in the venting system. The venting device is particularly intended for use in motor vehicles.

11 Claims, 1 Drawing Sheet

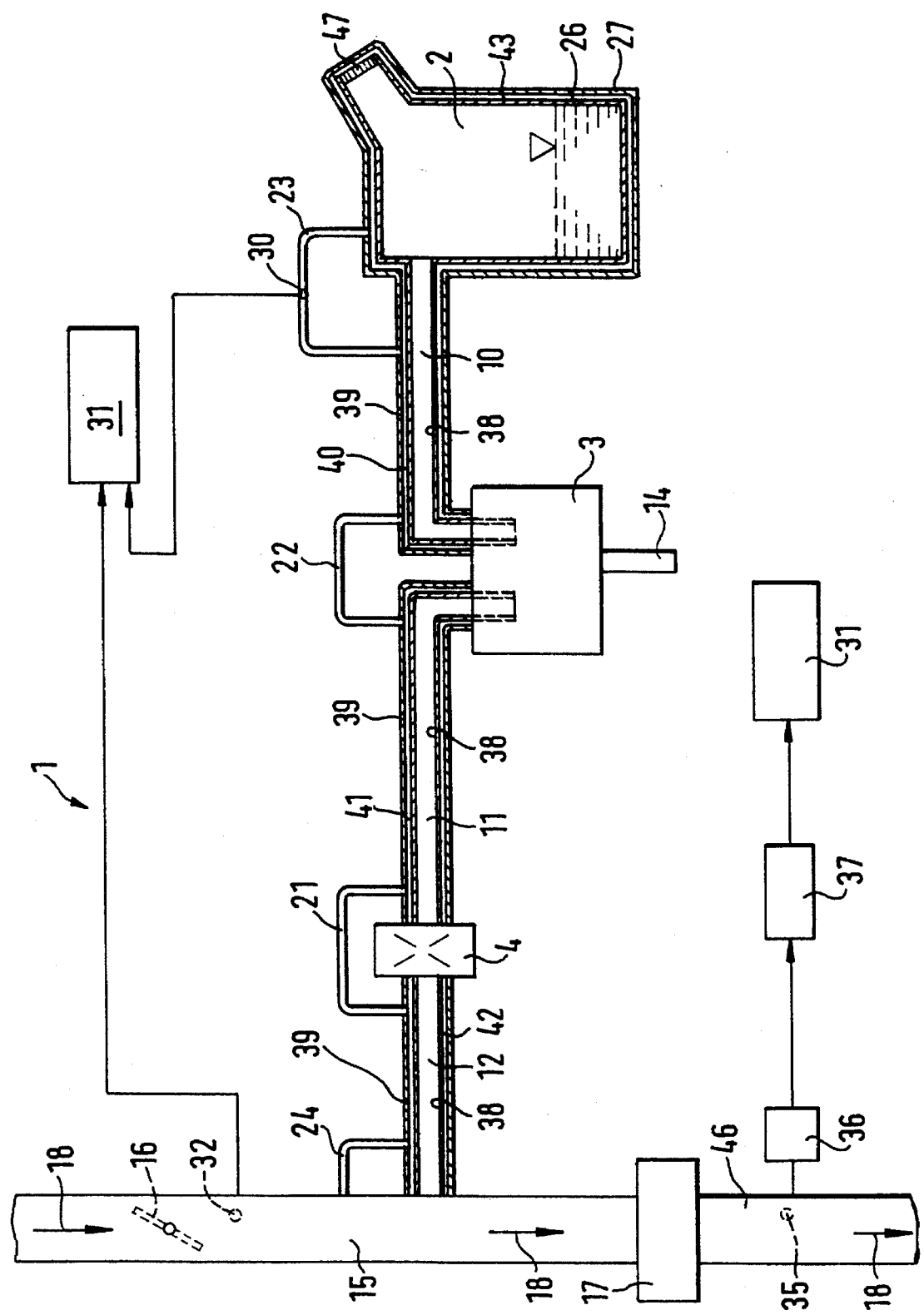

DEVICE FOR VENTING A FUEL TANK AND A PROCESS FOR CHECKING THE FUNCTIONAL CAPABILITY OF THE DEVICE

BACKGROUND OF THE INVENTION

The invention is based on a device for venting a fuel tank and on a process for checking the functional capability of the device as generically defined hereinafter. German Offenlegungsschrift 40 03 751 discloses a venting device in which the fuel vapors evaporating in a fuel tank are removed by suction so that for environmental protection reasons emissions, particularly of hydrocarbons, into the environment can be averted. From the fuel tank, the fuel vapors are introduced via a tank line into an adsorption filter embodied in the form of an activated charcoal filter, which adsorbs the fuel vapor or retains and temporarily stores it. Because an adsorption filter of this kind has a limited holding capacity, it must be regenerated, that is, rinsed with air, for which purpose a ventilation line is provided at the adsorption filter. When an internal combustion engine is in operation, a vacuum prevails in an intake pipe of the engine, so that air flows from the environment via the ventilation line into the adsorption filter in order to entrain the fuel stored in the adsorption filter or to mix the fuel with the aspirated air so that it can be introduced in the form of fuel vapor via a regenerating valve into the intake pipe in order then to be burned in a combustion chamber of the engine. The introduction of the fuel vapors, though, must be done deliberately, that is, only in selected operating ranges of the engine, so that on the one hand the exhaust emissions of the engine are not increased, and on the other hand, highly smooth engine operation remains guaranteed. To achieve this, the regenerating valve inserted between the adsorption filter and the intake pipe is triggered by an electronic control unit so that it opens only intermittently, in selected operating ranges of the engine, which are dependent on the vacuum in the intake pipe. To monitor the combustion of the engine and the opening times of the regenerating valve, a lambda control is typically provided in combination with a so-called adaptive mixture control, which constantly monitors the exhaust emissions by means of a lambda sensor placed in the exhaust flow of the engine, in order, for example by altering the injection times of the injection units provided in the engine to adjust the mixture composition at a predetermined air-fuel quantity ratio, at which ratio the combustion proceeds almost completely, with only slight exhaust emissions.

In venting devices of the prior art, the individual connecting lines from the fuel tank to the intake pipe are embodied as single walled, for example in the form of simple hoses. Fuel vapors can escape into the environment through the tiniest holes in the hoses, which occur from aging, without the driver of a vehicle equipped with such a venting device being able to notice it.

That is why legislators, particularly in California, have stipulated regular monitoring of the functional capability and tightness of venting devices of this kind. In this checking process, a stop valve provided at the adsorption filter only for checking purposes is for example manually closed, so that no air can flow into the adsorption filter via the ventilation line, after which the regenerating valve is brought to an open position. After the engine is started, the increase of the vacuum is measured by a pressure sensor of the engine installed in the fuel tank, which increase must be maintained for ample time in the fuel tank after the closing of the regenerating valve, so that leaks from the venting device can be precluded with high probability.

This checking process is relatively complicated, since to monitor the vacuum in the fuel tank, the regenerating valve and the stop valve must be brought to a checking, or open, position, and after the checking process must be returned to a functional position. It can happen that the stop valve at the adsorption filter remains in the closed position, for example because of a defect or carelessness. If the engine, with the regenerating valve closed, is then for example exposed to a strong temperature rise, an excess of pressure can build up in the fuel tank due to the increasingly evaporating fuel vapors; for safety reasons, at a predetermined excess pressure, this excess pressure must then escape into the environment via a safety valve provided on the fuel tank, in the course of which fuel vapors escape into the environment as well.

OBJECT AND SUMMARY OF THE INVENTION

The venting device according to the invention has an advantage over the prior art that leaks can be precluded with very high probability.

The process according to the invention has an advantage over the prior art that checking of the venting device can be done in a simple manner. The driver can be informed directly, for example visually, if the venting device leaks.

By the provisions defined herein, advantageous variants of and improvements to the venting device are possible. Advantageously, a stop valve at the adsorption filter, required in the prior art, and a safety valve at the fuel tank can be eliminated.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing shows a simplification of an exemplary embodiment of the invention.

DESCRIPTION OF THE PREFERRED EMBODIMENTS

The drawing shows a schematic representation of a venting device 1 for a fuel tank 2 that serves to supply fuel to an internal combustion engine, not shown. The venting device 1 has an adsorption filter 3 and a regenerating valve 4 and is intended particularly for installation in motor vehicles. The fuel tank 2 communicates with the adsorption filter 3 by means of a tank line 10, so that evaporating components of the fuel from the fuel tank 2 reach the adsorption filter 3, to be adsorbed in the adsorption filter or to be retained in it and temporarily stored. The adsorption filter 3 is embodied for example in the form of an activated charcoal filter and communicates via a filter line 11 with the regenerating valve 4, from which a valve line 12 leads into an air intake pipe 15 of the engine. The fuel vapors are introduced into the air intake pipe 15 from the valve line 12, for example downstream of a throttle valve 16 rotatably placed in the intake pipe 15, in which the intake air or an air-fuel mixture flows in the direction indicated by the arrows 18; then this mixture is burned in the schematically represented combustion chamber 17 of the engine. When the engine is running, a vacuum prevails in the intake pipe 15, with whose help, when the regenerating valve 4 is open, fuel vapors are aspirated via the valve line 12 and via the filter line 11 from the adsorption filter 3, or via the tank line 10 from the fuel tank 2. From the fuel tank 2, via the tank line 10, the fuel vapors first reach the adsorption filter 3 and are adsorbed in it.

When the engine is running, because of the vacuum in the intake pipe 15 air flows into a ventilation line provided at the adsorption filter 3 and into the adsorption filter 3, and entraining the fuel stored in the adsorption filter 3, so that the fuel is mixed with the inflowing air and then, in the form of fuel vapor, flows into the intake pipe 15 via the filter line 11 and the valve line 12 and then is burned in the combustion chamber 17 of the engine. The regeneration of the adsorption filter 3 is necessary in order to maintain an equilibrium between adsorbed and desorbed fuel in the adsorption filter 3, so that this filter can be embodied with a small structural volume; this assures that even in rest phases of the engine or in operating phases in which the regenerating valve 4 is closed, the adsorption filter 3 can store sufficient fuel vapor that no fuel vapors whatsoever will escape into the environment via the ventilation line 14, or at most can leave the adsorption filter 3 in filtered form, as air.

In order to prevent the possibility of leaks from the venting device 1 with a very high degree of certainty, some or all of the connecting lines leading from the fuel tank 2 to the intake pipe 15 are embodied according to the invention as double-walled, so that the fuel vapors flowing on the inside of the connecting lines is isolated from the environment by inner walls 38 and outer walls 39, or by the hollow spaces 40, 41, 42 enclosed between the inner walls 38 and the outer walls 39, as shown by the dashed lines. In the exemplary embodiment, the connecting lines consist of the tank line 10, the filter line 11, and the valve line 12 and are embodied by way of example in the form of double-walled hose lines. The fuel tank 2 can likewise be embodied as double-walled, which is why it is encased for example by means of an outer casing 27, which envelops an inner casing 26 of the fuel tank and with it encloses the hollow space 43. The hollow spaces 40, 41, 42 enclosed between the inner walls 38 and the outer walls 39 of the double-walled connecting lines 10, 11, 12 communicate with one another in the region of their connection points, for example, by means of bypass lines 21, 22, 23; the first bypass line 21 at the regenerating valve 4 connects the hollow space 42 of the valve line 12 to the hollow space 41 of the filter line 11, and the second bypass line 22 connects the hollow space 41 of the filter line 11 to the hollow space 40 of the tank line 10 at the adsorption filter 3, and the third bypass line 23 connects the hollow space 40 of the tank line 10 with the hollow space 43 of the double-walled fuel tank 2. The third bypass line 23 can be foregone if one connects the hollow space 40 of the tank line 10 directly to the hollow space 43 of the fuel tank 2. The bypass lines 21, 22, 23 are embodied for example in the form of single-walled hoses; for pressure connection between the hollow spaces 40, 41, 42, 43 and the vacuum in the intake pipe 15, the valve line 12, which is embodied as double-walled, is introduced with its hollow space 42 into the intake pipe 15, for example, so that when the engine is in operation, roughly the same vacuum prevailing in the intake pipe 15 also prevails in the hollow spaces 40, 41, 42 of the connecting lines 10, 11, 12 and in the bypass lines 21, 22, 23 and in the hollow space 43 of the fuel tank 2. As is shown in the drawing, in addition to the valve line 12, a separate connecting bypass line 24 is provided for pressure connection of the hollow spaces 40, 41, 42, 43 to the vacuum in the intake pipe 15; this line, for example in the form of a single-walled hose, additionally connects the hollow space 42 of the valve line 12 to the intake pipe 15. It is also possible to provide only one separate connecting bypass line 24 for the pressure connection of the hollow spaces 40, 41, 42, 43, so that downstream of the connecting point of connecting bypass line 24 and double-walled valve line 12, this line 12 continues in single-walled form, and feeds into the intake pipe 15.

The pressure connection of the individual hollow spaces 40, 41, 42, 43 makes it possible, if damage to the inner walls 38 of the connecting lines 10, 11, 12 or to the inner casing 26 of the fuel tank 2 occurs, for the fuel vapors to remain trapped in the hollow spaces 40, 41, 42, 43 and be aspirated into the intake pipe 15 by the vacuum, so that they cannot escape into the environment. In the event of possible damage to the outer walls 39 of the connecting lines 10, 11, 12 or to the outer casing 27 of the fuel tank 2, the fuel vapors remain in the inner casing of the venting device 1, which casing is embodied by the inner walls 38, so that at the very most, air is aspirated into the intake pipe 15 from the environment.

By means of the double-walled embodiment of the venting device 1, on the one hand, leaks can be prevented with very high probability, and on the other hand, the tightness and the functional capability of the venting device 1 can be checked in a simple manner, for which purpose a first pressure sensor 30 is provided. The pressure sensor 30 can be installed in the hollow spaces 40, 41, 42 of the connecting lines 10, 11, 12 or in the bypass lines 21, 22, 23 or in the hollow space 43 of the double-walled fuel tank 2. In the exemplary embodiment, the pressure sensor 30 is installed near the fuel tank 2 in the third bypass line 23, in order to measure the vacuum established after a short time upon operation of the engine; normally, if there is no leakage, this vacuum must be virtually equivalent to the vacuum in the intake pipe 15, or if need be may slightly diverge from the vacuum in the intake pipe 15 as a result of only slight pressure losses in the connecting lines 10, 11, 12 and in the bypass lines 21, 22, 23. If stronger pressure differences can be detected, though, this must be ascribed to a leak or a lack of tightness of the venting device 1. To evaluate the electrical signal supplied by the pressure sensor 30, this sensor communicates with an evaluation device, for example an electronic control unit 31, so that the increase and the behavior of the vacuum at the measuring point after the starting of the engine can be monitored. A second pressure sensor 32 likewise communicates with the electronic control unit 31 and is installed in the intake pipe 15, for example, downstream of the throttle valve 16 and measures the vacuum prevailing in the intake pipe 15. If the electronic control unit 31 detects a greater pressure difference between the vacuum in the intake pipe 15 and the pressure in the third bypass line 23, for example, then a leak exists in the venting device 1. In this event, the control unit 31 can trigger a warning light in the interior of the vehicle to inform the driver of the leak so that he can go immediately to a repair facility. For easy malfunction diagnosis in the repair facility, the leak message can additionally be stored in the unit memory in the form of a so-called malfunction code.

Furthermore, the double-walled embodiment of the fuel tank 2 also makes it possible to detect the loss of a gas cap 47 or the incomplete screwing-on of the gas cap 47, and to notify the driver thereof. To do so, the gas cap 47 must be included in the double-walled design of the fuel tank 2 so that the outer casing 27, or the hollow space 43 of the fuel tank 2, is sealed pressure-tight only once the gas cap 47 is completely screwed on. If this is not the case, no vacuum can build up in the hollow space 43 of the fuel tank 2, and so the control unit 31 detects a leak, whose cause is either the loss or incomplete screwing-on of the gas cap 47.

In lieu of the above mentioned monitoring of the tightness or in addition to it, the venting device 1 can be equipped with an additional monitoring device, or else a lambda control 36, which is known for electronic motor control, can be used. In the case of the lambda control 36, a lambda sensor 35 is installed downstream of the combustion chamber 17 in an exhaust gas stream 46 of the engine in order to determine the proportion of residual oxygen in the exhaust gas stream 46 and, by changing the injection times of the injection units, by means of the control unit 31, to maintain a precise air-fuel quantity mixture at which almost complete combustion occurs in the combustion chamber 17 of the engine, with low exhaust emissions. In addition to the lambda control 36, a device 37 is provided for adaptive mixture correction, which guarantees that besides the influence of the air pressure of the aspirated air, individual tolerances and longer-term variances during the entire running time of the engine will also be detected for example at the injection units, stored in a performance graph of the control unit 31, if need be by means of suitable correction values, and compensated for by an altered mixture composition. The control unit 31 compares the values continuously ascertained by the lambda control 36 to the values stored in the performance graph of the control unit 31, or to the values of the performance graph adapted by the adaptive mixture correction device 37, so that when there is a clear difference between the values, a finding of functional incapability and untightness of the venting device 1 can be made. A clear difference between the values can occur for example if leaning-down of the air-fuel mixture occurs from an air excess, which is caused by leakage of the venting device 1. The lambda control 36, for example in combination with the adaptive mixture correction device 37, can therefore likewise be used to monitor the functional capability and tightness, for example in addition to the measurement of the vacuum with the pressure sensor 30 in the third bypass line 23.

The venting device 1 according to the invention requires no stop valve on the ventilation line 14 and no safety valve on the fuel tank 2, so that even in the event of a faulty regenerating valve 4 when the valve line 12 is closed, the fuel vapors can escape at any time in a filtered state, in the form of air, into the environment from the ventilation line 14 through the adsorption filter 3; as a result, no dangerous excess pressure builds up in the fuel tank 2, particularly when it is strongly heated.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A venting device for a fuel tank that serves to supply fuel to an internal engine, which comprises connecting lines which connect said fuel tank to communicate with an intake pipe of said internal combustion engine via an adsorption filter, and at least one of the connecting lines (10; 11; 12) is embodied as double-walled with a hollow space (40, 41, 42) between the double walls and the hollow space and at least one double-walled connecting line are connected to the intake pipe.

2. The venting device according to claim 1, in which the fuel tank (2) is embodied as double-walled.

3. The venting device according to claim 2, in which a pressure sensor is disposed in the hollow space surrounding said fuel tank.

4. The venting device according to claim 2, in which a hollow space (43) embodied around the fuel tank (2) communicates with hollow spaces (40, 41, 42) of each of said at least one connecting line of the double-walled connecting lines (10, 11, 12).

5. The venting device according to claim 4, in which a pressure sensor (30) is disposed in one of the hollow spaces (40, 41, 42, 43) of at least one of the connecting lines (10, 11, 12) or on the fuel tank (2).

6. The venting device according to claim 4, in which a pressure sensor is disposed in the hollow space surrounding said fuel tank.

7. The venting device according to claim 1, in which the venting device (1) has a regenerating valve (4) in one of said at least one connecting lines.

8. The venting device according to claim 1, in which bypass lines (21, 22, 23) connect individual hollow spaces (40, 41, 42) of each of said at least one connecting line, which are embodied by means of the double-walled connecting lines (10, 11, 12), to one another.

9. The venting device according to claim 8, in which a pressure sensor (30) is disposed in one of the hollow spaces (40, 41, 42, 43) of at least one of the connecting lines (10, 11, 12) or on the fuel tank (2).

10. A process for checking a functional capability of a venting device for a fuel tank of an internal combustion engine, in which the fuel tank communicates via an adsorption filter and first, second and third connecting lines with an intake pipe of said internal combustion engine, which comprises forming the fuel tank with a double wall which forms a hollow space (43) surrounding said fuel tank, directing fuel vapors from the fuel tank via said first connecting line into said adsorption filter and from said adsorption filter into the intake pipe via said second connecting line, via a regenerating valve and said third connecting line, forming said first, second and third connecting lines (10, 11, 12) with double walls to form first, second and third hollow spaces (40, 41, 42) within the double walled connecting lines respectively, connecting first, second and third bypass lines (21, 22, 23) respectively with said hollow spaces (40, 41, 42) formed by said double walls so that said hollow spaces communicate with one another in sequence and said hollow space (42) connects with the intake pipe (15); installing a pressure sensor (30) in at least one of said first, second or third hollow spaces (40; 41; 42) of one of said first, second or third double wall connecting lines (10; 11; 12); and measuring the pressure which is established when the engine is running by said pressure sensor and sending a pressure signal from said pressure sensor to an electronic control unit (31), and finally, comparing the pressure signal with a pressure in the intake pipe (15) that is supplied to the electronic control unit (31) in order to determine whether a leak has developed in said venting device.

11. The process according to claim 10, which comprises disposing a lambda sensor (36) in an exhaust gas stream (46) of the engine, and sending a signal value of the lambda sensor (36) to the electronic control unit (31), and comparing the sent value signal with a predetermined value for an operating range value of the engine, which operating range value is stored in memory in the control unit (31), measuring a difference between the sent value signal and the operating range value as a functional capability of the venting device (1), the values stored in memory in the control unit (31) are supplied to the engine by an adaptive mixture correction device (37) and are adapted to long-term alterations of the engine.

* * * * *